(12) United States Patent
Subramanian et al.

(10) Patent No.: US 11,025,527 B2
(45) Date of Patent: Jun. 1, 2021

(54) TOPOLOGY CHANGE PROCESSING IN BRIDGED NETWORKS USING A SPANNING TREE PROTOCOL

(71) Applicant: DELL PRODUCTS L.P., Round Rock, TX (US)

(72) Inventors: Palanisamy Subramanian, Chennai (IN); Ravisekhar Akkineni, Chennai (IN); Saye Balasubramaniam Subramanian, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 16/518,826

(22) Filed: Jul. 22, 2019

(65) Prior Publication Data

US 2021/0029018 A1 Jan. 28, 2021

(51) Int. Cl.
| | |
|---|---|
| *H04L 12/46* | (2006.01) |
| *H04L 12/751* | (2013.01) |
| *H04L 12/757* | (2013.01) |
| *H04L 12/753* | (2013.01) |
| *H04L 12/18* | (2006.01) |

(52) U.S. Cl.
CPC ........ *H04L 45/025* (2013.01); *H04L 12/1895* (2013.01); *H04L 12/462* (2013.01); *H04L 45/023* (2013.01); *H04L 45/48* (2013.01)

(58) Field of Classification Search
CPC . H04L 45/025; H04L 12/1895; H04L 12/462; H04L 45/023; H04L 45/48
See application file for complete search history.

(56) References Cited

U.S. PATENT DOCUMENTS

| | | | | |
|---|---|---|---|---|
| 6,330,229 | B1 * | 12/2001 | Jain ..................... | H04L 12/4625 370/256 |
| 7,061,875 | B1 * | 6/2006 | Portolani .............. | H04L 12/462 370/256 |
| 7,379,429 | B1 * | 5/2008 | Thottakkara .......... | H04L 12/437 370/256 |
| 7,453,825 | B1 * | 11/2008 | Sivasankaran .... | H04L 12/40182 370/216 |
| 9,059,930 | B2 | 6/2015 | Janardhanan et al. | |
| 2002/0023170 | A1 * | 2/2002 | Seaman ................ | G06Q 30/02 709/235 |
| 2005/0050220 | A1 * | 3/2005 | Rouyer, V .............. | H04L 45/48 709/232 |
| 2006/0123561 | A1 * | 6/2006 | Wang ................... | C11D 3/3734 8/147 |
| 2006/0171302 | A1 * | 8/2006 | Tallet ..................... | H04L 45/48 370/225 |
| 2009/0279549 | A1 * | 11/2009 | Ramanathan ............ | G06F 8/61 370/395.4 |

(Continued)

OTHER PUBLICATIONS

IEEE (Institute of Electrical arid Electronic Engineers) Standard 802.1D, Jun. 9, 2004.

(Continued)

*Primary Examiner* — Chi Ho A Lee
(74) *Attorney, Agent, or Firm* — Haynes and Boone, LLP

(57) ABSTRACT

In a spanning tree network, topology change notifications are omitted when a port becomes forwarding if the peer port is an Alternate or Backup port in Discarding state. Other features are also provided.

18 Claims, 14 Drawing Sheets

(56) References Cited

U.S. PATENT DOCUMENTS

2012/0020206 A1* 1/2012 Busi ................. H04L 45/22
   370/217
2014/0314095 A1* 10/2014 Saltsidis ............. H04L 45/245
   370/394
2015/0207671 A1* 7/2015 Farkas ................ H04L 12/28
   370/228

OTHER PUBLICATIONS

"Understanding Rapid Spanning Tree Protocol (802.1w)", Cisco, Inc., Document ID 24062, Aug. 1, 2017.

* cited by examiner

TOPOLOGY CHANGE PROCESSING IN BRIDGED NETWORKS USING A SPANNING TREE PROTOCOL

BACKGROUND

The present disclosure relates to computer networks, and more particularly to topology changes in networks using a spanning tree protocols.

FIG. 1 shows a typical network 104 interconnecting network stations 110. The network is divided into multiple segments Lx (L1, L2, L3, ... ). Data are forwarded from one segment Lx to another through bridges Bx (B1, B2, etc.). Each segment Lx has zero or more stations 110, and has one or more bridges attached to the segment. A segment Lx can be a bus type (e.g. Ethernet), a token ring, or some other type.

An important goal in network management is loop avoidance, i.e. not allowing data to circulate from bridge to bridge, possibly never reaching the destination. Loops can be avoided by selectively deactivating some of the bridge ports so that the network would have only one active path between any two bridges Bx and between any two segments Lx.

Specifically, each bridge Bx has ports connected to respective segments ("links") Lx. For example, bridge B1 has ports P1, P2, P3 connected to respective links L2, L7, L1. See also FIG. 2, in which the stations 110 are omitted for clarity. Network 104 has a loop formed by bridges B1, B2, B4, B6. The loop can be eliminated by blocking a port in the loop, for example, port P2 of switch B6. The port blocking is shown in FIG. 2 by line 210 adjacent to port P2. Port P2 can be unblocked in case of failure of some other port in the loop, e.g. of port P2 of bridge B2; or in case there is a change in the cost of the paths, e.g. if link L5 becomes more expensive and/or link L6 becomes less expensive; or in case a link or a bridge is added or removed; or in response to other needs.

Bridges Bx can automatically configure themselves to block or unblock their ports. The configuration can be performed by the bridges executing a Spanning Tree Protocol (STP) or its variants, e.g. Rapid Spanning Tree Protocol (RSTP), Multiple Spanning Tree Protocol (MSTP), or some other STP variant; STP and its variants are denoted generally as "xSTP". RSTP is described, for example, in IEEE (Institute of Electrical and Electronic Engineers) Standard 802.1D™-2004, incorporated herein by reference; and is currently defined by IEEE standard 802.1w. See e.g. "Understanding Rapid Spanning Tree Protocol (802.1w)", Cisco, Inc., Document ID: 24062, Aug. 1, 2017, incorporated herein by reference. Under xSTP, the bridges Bx exchange Bridge Protocol Data Units (BPDUs) to learn about each other and block or unblock ports as needed. The BPDUs are consumed by the bridges and are not forwarded. Therefore, BPDUs cannot circulate indefinitely, and can be transmitted even on blocked ports and even if loops are present.

Much effort has been devoted to shorten the time and network traffic required for network configuration. See e.g. U.S. Pat. No. 9,059,930, issued Jun. 16, 2015 (inventors: Janardhanan et al.), incorporated herein by reference. Improved network configuration techniques are desirable.

SUMMARY

This section describes some aspects of the present invention. Other aspects are described in subsequent sections. The invention is defined by the appended claims.

Some embodiments of the present invention provide network configuration techniques that may reduce the configuration time and/or improve bridge resource utilization. For example, as described in the aforementioned U.S. Pat. No. 9,059,930, a port reconfiguration on one bridge may require topology change notifications sent to other bridges. Some embodiments identify specific situations when topology change notifications are unnecessary. The topology change notification (TCN) traffic is therefore reduced, resulting in better bandwidth utilization and reduction of unnecessary TCN processing by bridges.

Other features are within the scope of the present invention as defined by the appended claims.

DETAILED DESCRIPTION

This section illustrates some features of the invention. The invention is not limited to such features, except as defined by the appended claims.

Figure 1:
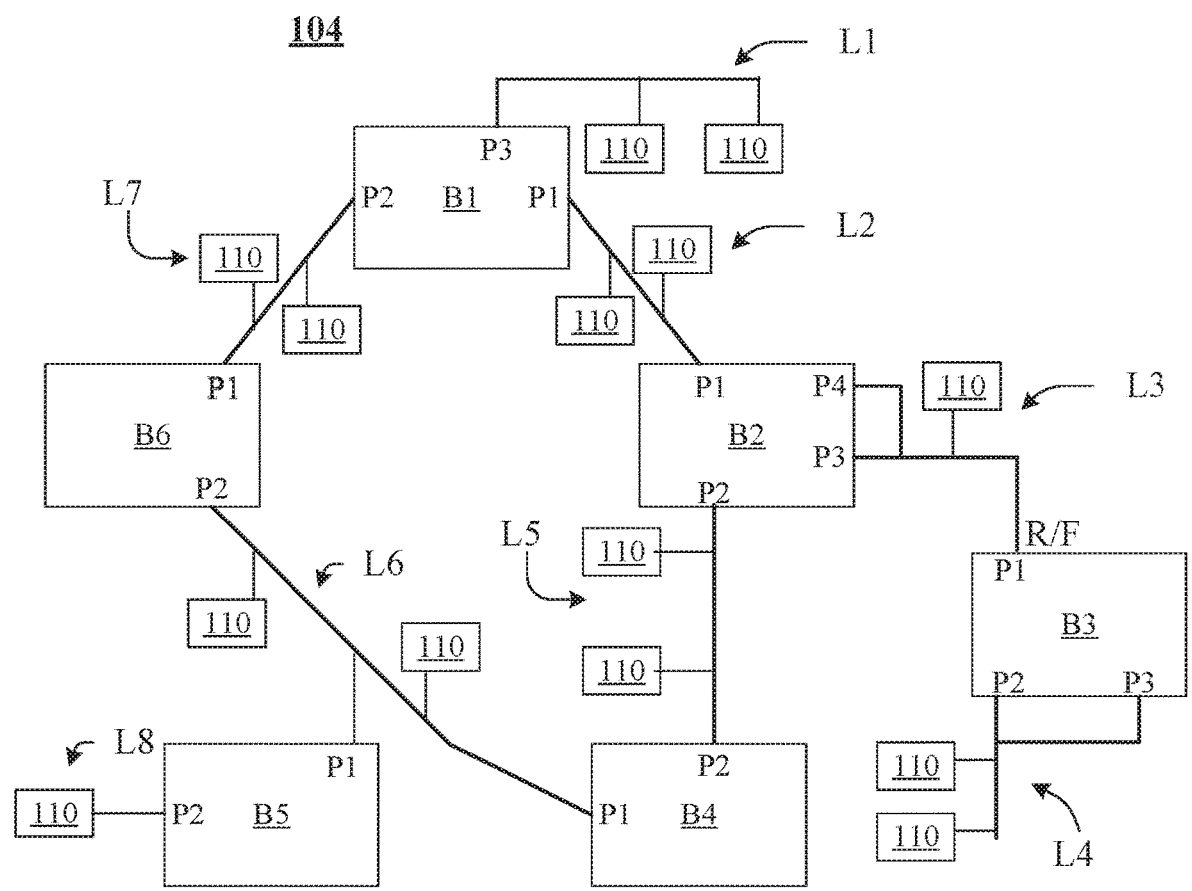
FIGS. 1 and 2 illustrate a bridged network.
Figure 2:
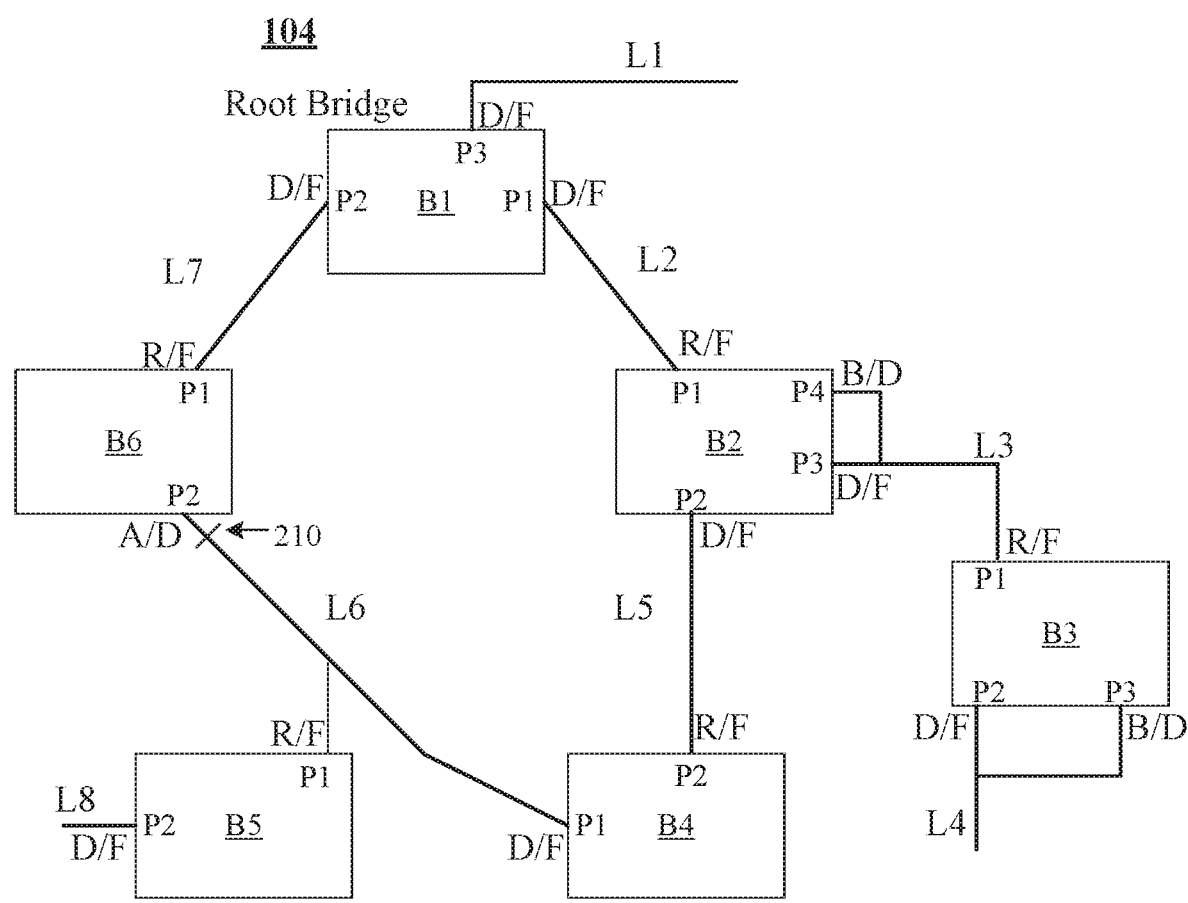

As noted above, the xSTP protocols aim at providing only one active path between any two bridges and between any two segments. This means that the active network topology is a tree. In the example of FIG. 2, the bridge B1 can be the root bridge of the tree. (The root bridge can be selected by an administrator (a human), or automatically selected using bridge priorities and/or bridge IDs; see the IEEE 802.1D standard cited above.) Every non-root bridge Bx has a Root port through which the bridge can reach the root bridge B1 in the active topology. (Typically, the Root port is on the lowest-cost path to the Root bridge.) For example, in bridges B6, B2, and B3, the ports P1 are Root ports, having Root "role" in RSTP terminology. (RSTP is used as an example; some aspects of the invention apply to other xSTP protocols.) In stable topology (not during network configuration), the Root ports are active, i.e. in Forwarding state. The forwarding state is shown as "/F" in FIG. 2, so the Root/Forwarding ports are marked as "R/F".

In each network segment Lx, there is a single Forwarding port used by the segment's stations 110 to reach the root bridge B1. This port's role is "Designated" (shown as "D" in FIG. 2). For example, in segment L6, the port P1 of bridge B4 is Designated (shown as "D/F"; the port is Forwarding). Typically, the Designated port is on the lowest-cost path to the Root bridge.

In bridge B6, port P2 is blocked, i.e. in Discarding state (shown as /D). This port's role is "Alternate" ("A"): if Root port P1 fails, the port P2 may become unblocked, and may become the Root port, to provide access to root bridge B1 through bridges B4 and B2.

In bridge B2, port P3 is Designated for segment L3, and port P4 is Backup for the same segment: if the Designated port P3 fails, port P4 may become the new designated port. The Alternate and Backup ports are typically Discarding (/D).

Besides the Forwarding and Discarding states, a port may be in a "Learning" state, which can be intermediate between Discarding and Forwarding. For example, if port P1 on bridge B4 fails, and port P2 on bridge B6 becomes Designated for segment L6, then port P2 of bridge B6 may become Learning before becoming Forwarding. In Learning state, the port P2 will monitor the data from stations 110 on segment L6 to learn their addresses. The addresses are recoded in filtering data base (FDB) 302 shown in FIG. 3 and described below. After a short period of time, a Learning port becomes Forwarding.

Figure 3:
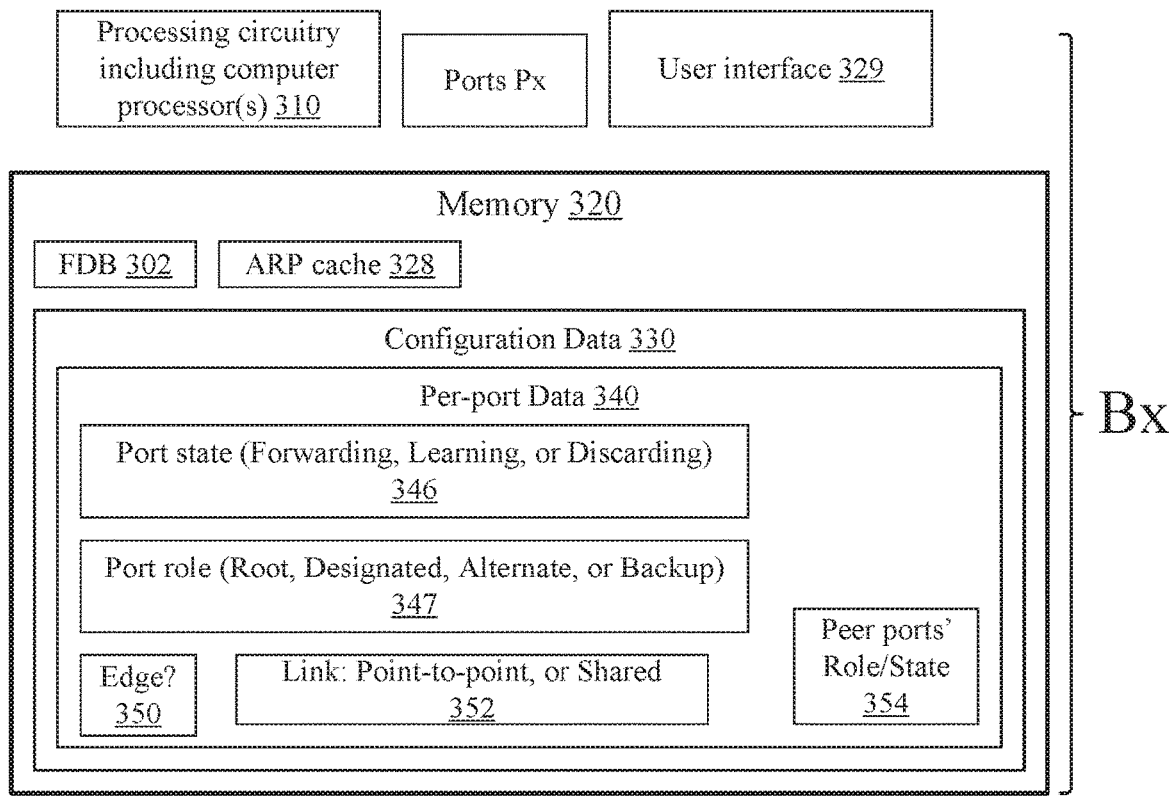
FIG. 3 illustrates a network bridge.

FIG. 3 illustrates an exemplary architecture of a bridge Bx. (Other architectures are also possible, and different bridges may have different architectures in the same network.) The bridge of FIG. 3 includes circuitry 310 which may include one or more computer processors that execute computer programs with instructions (not shown) stored in memory 320. For example, the computer programs may execute the learning algorithms to learn the station 110 addresses and store them in FDB 302 maintained in memory 320. The address learning occurs when a port receives data in the Learning or Forwarding state. The computer programs may also create and maintain Address Resolution Protocol (ARP) cache 328 stored in memory 320 and described below. Circuitry 310 may also include circuits that receive, store, and forward data frames based on FDB 302 and ARP cache 328 and possibly other data.

The bridge includes ports Px (such as P1, P2, etc. described above) and, possibly, user interface 329 for use by an administrator.

Memory 320 includes configuration data 330 which define various aspects of the bridge operation. See e.g. the aforementioned IEEE Standard 802.1D-2004. In particular, for each port Px, configuration data 330 includes per-port data 340 which define various aspects of the port operation. The types of port data depend on the STP variant and implementation, and may include: state data 346 indicating the port's state (Forwarding, Discarding, or Learning in RSTP); role data 347 indicating the port's role (e.g. Root, Designated, Alternate, or Backup); Edge port flag 350 (explained below); link type 352 (explained below); and peer port data 354, defining the role and state of the peer ports, i.e. other bridge ports on the same link Lx.

Edge port flag 350 defines whether the port is an Edge port, i.e. the attached link Lx is not attached to any other bridge port. For example, the port P2 of bridge B5 is an Edge port.

Link type 352 indicates, for a non-edge port, whether the attached link is point-to-point (attached to only one other bridge port) or shared (attached to more than one other bridge ports). In FIG. 2, link L6 is shared, and links L4 and L7 are point-to-point.

If the port s not an edge port, then peer port data 354 define the role and state of every peer port.

The data described above indicate the type of information stored by the bridge; this information can be coded in many ways. For example, edge port flag 350 and link type 352 can be represented by a single code: "zero" means this is an Edge port; "1" means this is a point-to-point link; "2" means a shared link. Other variations are possible.

Figure 4:
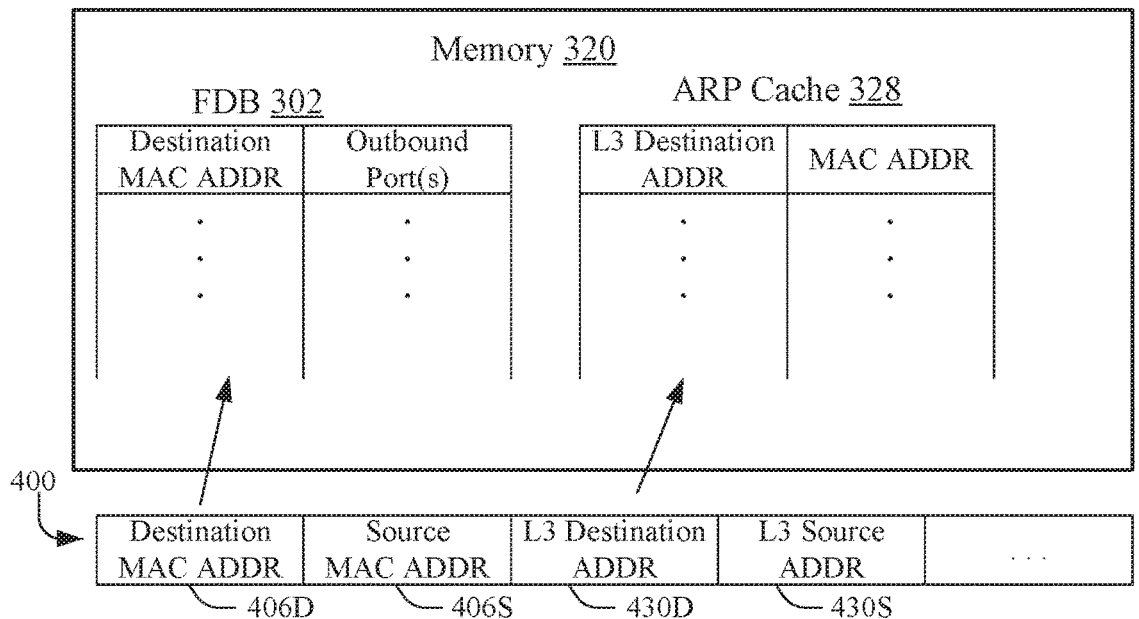
FIG. 4 illustrates network data.

FIG. 4 illustrates FDB 302, ARP cache 328, and a data frame 400. When a bridge Bx receives a data frame 400, the bridge must decide on which port ("outbound port") the frame must be forwarded. Data frame 400 contains a source address 406S and a destination address 406D (sometimes called MAC addresses (MAC stands for Media Access Control) or Layer-2 addresses). The FDB 302 specifies the outbound port or ports for destination address 406D. For example, for bridge B1, the FDB 302 may specify the port P1 for destination addresses on LAN (Local Area Network) segments L2 through L6 and L8.

The bridge will not forward a frame on a port on which the frame was received.

If the destination address 406D is not in database 302, the bridge floods the frame, i.e. forwards the frame on all the ports except the port on which the frame was received (unless security or other restrictions apply). Flooding can be avoided however if ARP cache 328 is used to forward the frame, as described below.

FDB 302 can be populated by an administrator (a human), but can also be dynamically learned by the bridge from the data frames' source addresses. For example, if bridge B1 receives a data frame on port P1 with some source address value AD1, the bridge will associate AD1 with the port P1, and will enter this association into FDB 302. The database will show the port P1 as the outbound port for address AD1. Clearly, when the network topology changes, e.g. stations 110 or Bx are disconnected or moved, the filtering database 302 should be flushed entirely or partially. Preferably, the flooding should be limited to those entries which become obsolete due to the topology change. Removal of other entries may lead to unnecessary flooding.

ARP cache 328 is used for forwarding data frames for which the bridge does not have a MAC address in FDB 302, if the data frame contains a network destination address 430D (also called Layer-3 address, e.g. an IP address). No flooding is performed in this case. Specifically, a data frame's Layer-2 payload may include Layer-3 destination address 430D and Layer-3 source address 430S. If the data frame's MAC destination address 406D is the bridge's address, and the frame's Layer-3 destination address 430D is present in the bridge's ARP cache 328, then the bridge will forward the frame to the corresponding MAC address in the ARP cache (unless restrictions apply). The MAC address can be looked up in FDB 302 to determine the outbound port. The MAC address may be that of the final destination (the same as identified by Layer-3 address 430D), or may be of another bridge that can forward the frame to the final destination.

The ARP cache is populated by an administrator or an automatic learning process in which the bridge may broadcast an inquiry about a layer-3 address to obtain the corresponding MAC address; the MAC address is provided in response to the inquiry by the address owner (a station 110 or bridge Bx) or another bridge that can forward data frames to the layer-3 address.

If a port Px is no longer part of the active topology, some stations 110 and bridges Bx are no longer reachable through the port, and the corresponding dynamic entries in the bridge's FDB 302 should be removed. See IEEE 802.4, section 17.11. (Dynamic entries are modifiable entries obtained through learning, as opposed to Static, non-modifiable entries.) For example, if port P2 of bridge B2 goes down, and port P2 of bridge B6 is unblocked, then bridge B2 should remove the MAC addresses associated with its port P2 from the bridge's FDB 302.

The ARP cache should also flushed. The reason is as follows. In a bridge, different ports have different MAC addresses. Therefore, in the ARP cache, the MAC addresses correspond to the ports of final destinations or intermediate bridges. If the topology changes, the path to the final destination or the intermediate bridge may also change, and may terminate at a different port of the final destination or the intermediate bridge. In such a case, the MAC address in the ARP cache should change.

An entry removal can be performed by reducing the entries' aging time, e.g. from 300 seconds to 15 seconds in the FDB.

Topology changes should also be reflected in other bridges. For example, in bridge B6, the newly-activated port P2 provides a new way to reach the segments L6, L5, and L8, which were previously reachable through port P1. Therefore, bridge B6 should flush its FDB 302 and ARP cache 328. Hence, when a bridge changes the state of any port to Forwarding, the bridge sends a topology change notification message (TCN) on this port and all the other active (Forwarding) ports. (In RSTP, a TCN can be sent as a BPDU with the TC flag set.) Each bridge receiving a TCN removes, from its FDB 302, the entries associated with the addresses learned on all the other active non-Edge ports, and transmits TCNs on such ports. For example, when bridge B1 receives a TCN on port P2, bridge B1 removes the FDB entries for port P1, and propagates the TCN on port P1. Port P3 is an Edge port, and is excepted from this process: the entries learned on this port are not removed, and no TCN is propagated on the port. See e.g. the topology change state machine in the aforementioned IEEE Standard 802.1D, section 17.31.

When any part of the FDB is flushed, the ARP cache is also flushed.

Some topology changes do not need FDB or ARP flushing however; see for example, the aforementioned U.S. Pat. No. 9,059,930. At least some TCNs can be omitted in such cases.

Figure 5:
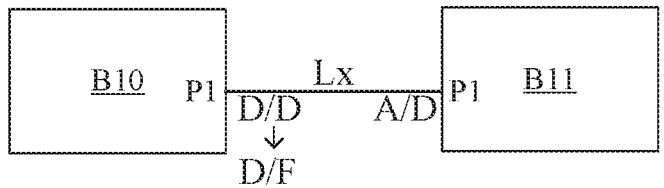
FIG. 5 illustrates a bridged network.
Figure 6:
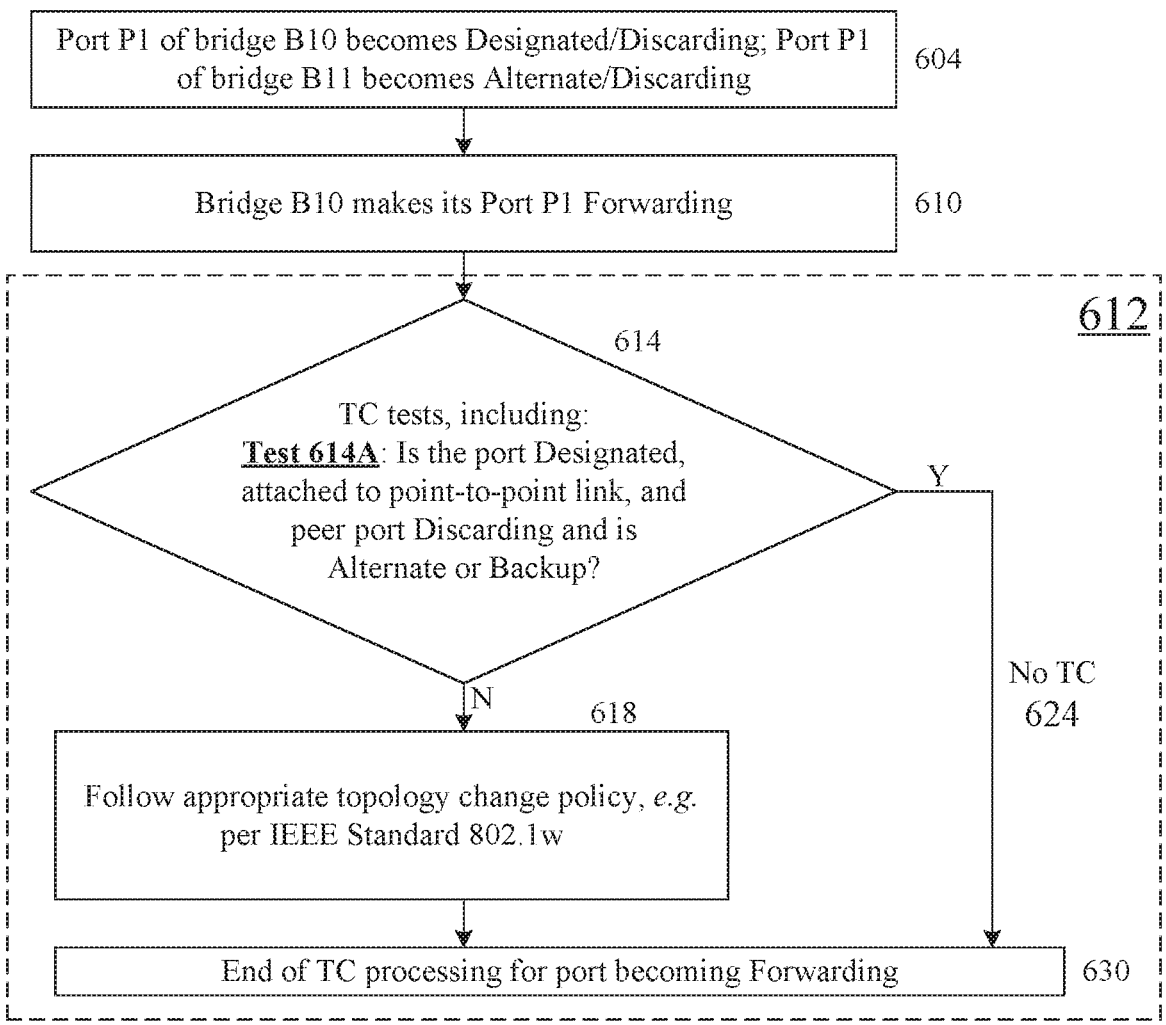
FIG. 6 is a flowchart of a network configuration process.

The inventors discovered additional cases when TCNs can be omitted. In particular, if a Designated port is becoming Forwarding on a point-to-point link, and the peer port is Alternate/Discarding or Backup/Discarding, then the paths to the root bridge and the paths between pre-existing links Lx do not change, and a TCN is unnecessary. For example, FIG. 5 shows a point-to-point link Lx interconnecting the ports P1 of bridges B10 and B11. FIG. 6 shows a pertinent part of the network configuration process. At step 604, bridge B10 makes its port P1 Designated, and records the Designated role in corresponding data block 347 (FIG. 3). Bridge B11 makes its port P1 Alternate, which is recorded in data block 347 of bridge B11 and in peer data block 354 of bridge B10. At this time, both ports are Discarding, as recorded in the bridges' blocks 346. Then bridge B10 exchanges BPDUs with bridge B11 (e.g. Proposal/Agreement BPDUs in RSTP), and determines that its port P1 can be made Forwarding. Bridge B10 makes its port Forwarding (step 610 in FIG. 6): the bridge updates the corresponding data 346 (FIG. 3). Bridge B10 also executes the TC process 612, which is executed when a port becomes Forwarding. Specifically, at step 614, the bridge performs one or more tests to determine whether TC processing is needed. The one or more tests include a test 614A, which checks the port's data 352 and 354 to determine whether the attached link Lx is point-to-point, and the peer port (P1 of bridge B11) is Discarding and is Alternate or Backup. If test 614A passes (as is the case in FIG. 5), the bridge omits topology change (TC) processing, as schematically shown at 624. In particular, the bridge does not change its FDB 302 or ARP cache 328, and does not send any TCNs.

Test 614 may include other tests. For example, if the port is an Edge port, TC processing can be omitted (path 624 is followed). Other possible tests are described in the aforementioned U.S. Pat. No. 9,059,930, and still other tests are possible.

If test 614 fails, the appropriate TC policy is followed (step 618), e.g., as specified in IEEE Standard 802.1w. For example, bridge B10 may flush its FDB 302 and ARP cache 328, and may transmit TCNs on all the active, non-edge ports.

Step 630 schematically indicates the end of TC process performed in connection with a port becoming Forwarding.

Figure 7:
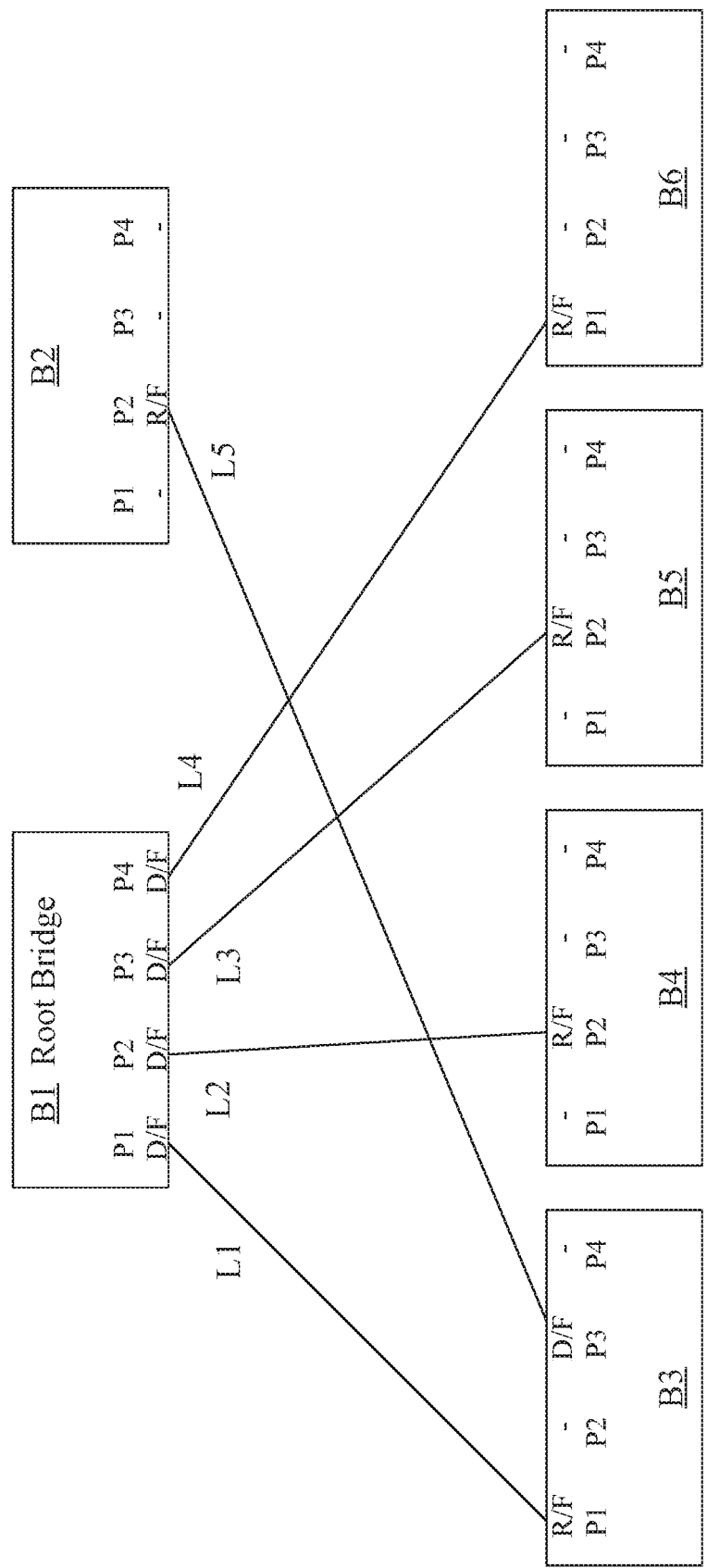
FIGS. 7, 8, 9, 10A, 10B, 11A, 11B, 11C, 11D, 11E illustrate bridged networks.

Some TC processing examples will now be illustrated for the network of FIG. 7 running RSTP. The network has six bridges B1 through B6. Each bridge has four ports P1 through P4. In all the examples, all links Lx are point-to-point. Bridge B1 has been elected as the Root bridge. Its ports P1 through P4 are Designated/Forwarding, and are connected by respective links L1 through L4 to the following respective ports, all of which are Root/Forwarding: port B3/P1, i.e. bridge B3, port P1; port B4/P2; port B5/P2; port B6/P1.

Link L5 connects port B2/P2 (Root/Forwarding) to port B3/P3 (Designated/Forwarding). The remaining ports are disabled, as shown by dashes (-). Disabled ports are ports disabled by an administrator; they are treated as non-existent by xSTP, with no BPDUs transmitted on them, and incoming BPDUs being ignored.

Then (FIG. 8) link L6 is added to connect port B2/P1 to port B3/P2. When the RSTP algorithm is executed by the bridges, the two ports are initially Designated/Discarding. Then port B2/P1 becomes Alternate.

Bridge B3 then initiates the RSTP "sync" process, sending a Proposal BPDU on port P2 (with "Proposal" bit set), to propose moving the port P2 to Forwarding. Bridge B2 responds with the Agreement BPDU.

Bridge B3 then makes P2 Forwarding (step 610 in FIG. 6), and executes the TC process 612. In this process, the test of step 614A is successful, so no topology change is detected (i.e. no TC processing is performed); see control path 624. The network resource utilization is consequently improved.

Figure 8:
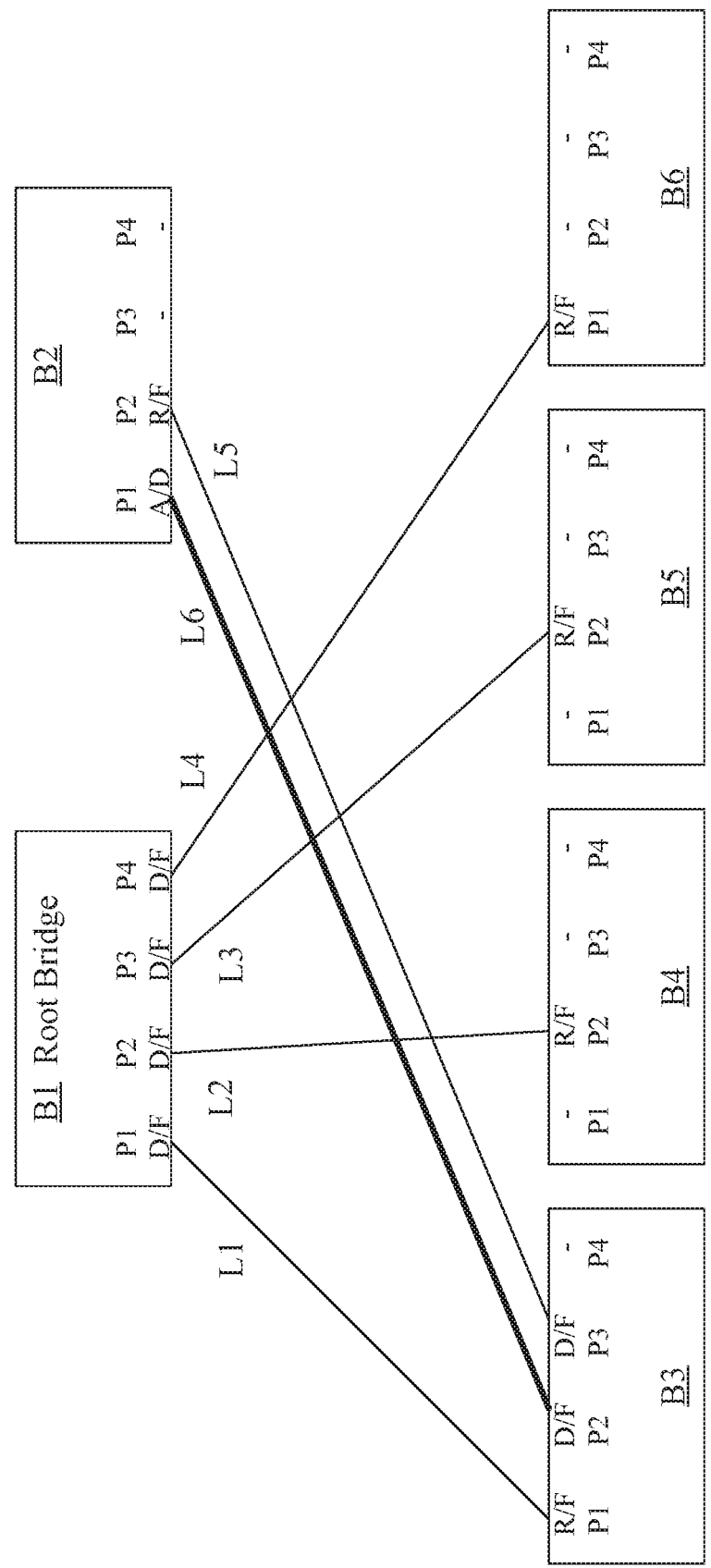

As is clear from FIGS. 7 and 8, the addition of link L6 does not change the network paths between the pre-existing links L1 through L5, so FDB or ARP flushing is not needed.

Figure 9:
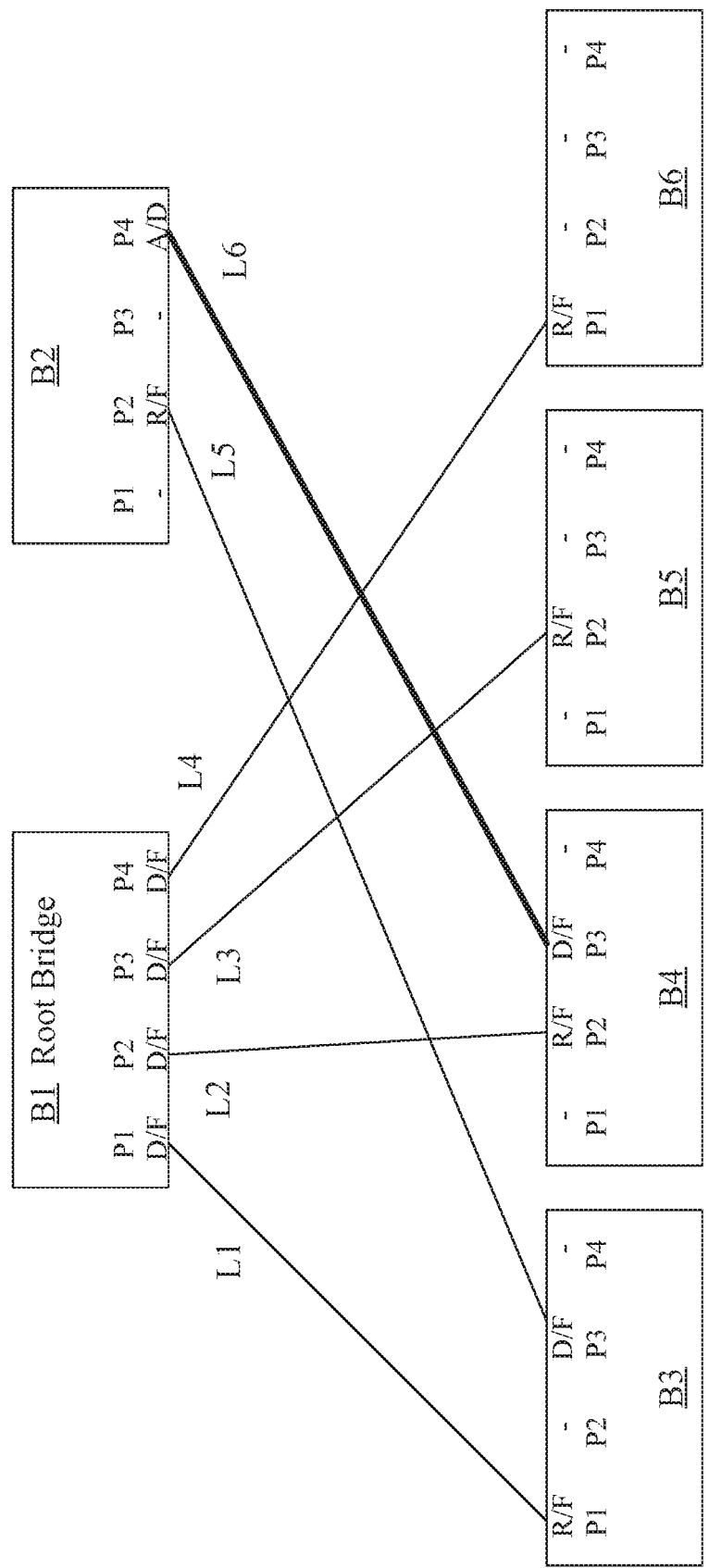

FIG. 9 is similar to FIG. 8, illustrating the addition of link L6 to the network of FIG. 7, but link L6 of FIG. 9 connects port B2/P4 to port B4/P3. The network reconfiguration process is similar to the one of FIG. 8. In particular, the newly interconnected ports, B2/P4 and B4/P3 are initially disabled, then become Designated/Discarding, then port B2/P4 become Alternate. Bridge B4 initiates the Proposal/Agreement sequence, then makes its port P3 Forwarding; this state is illustrated in FIG. 9. The test 614A is successful, so the topology change is not detected (control path 624).

In some examples, if a link or a bridge goes down, the TCNs may be generated as in prior art.

Figure 10A:
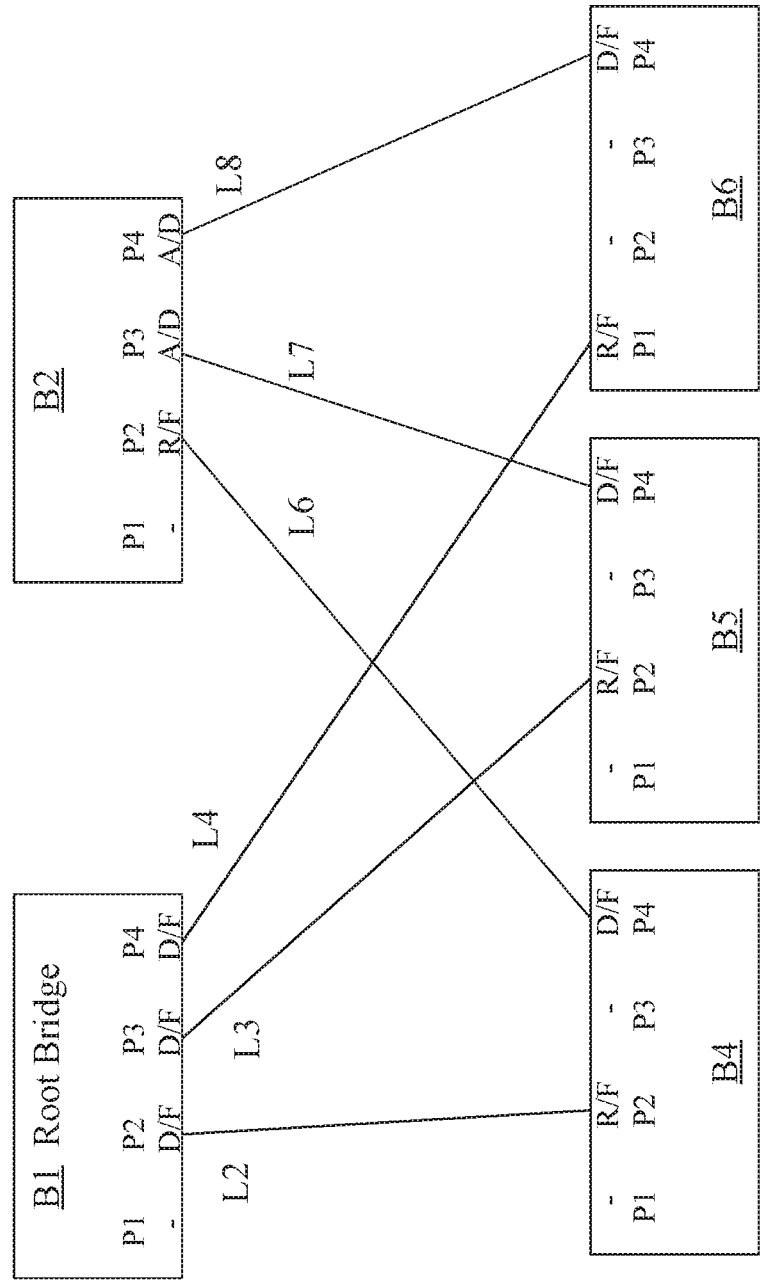
Figure 10B:
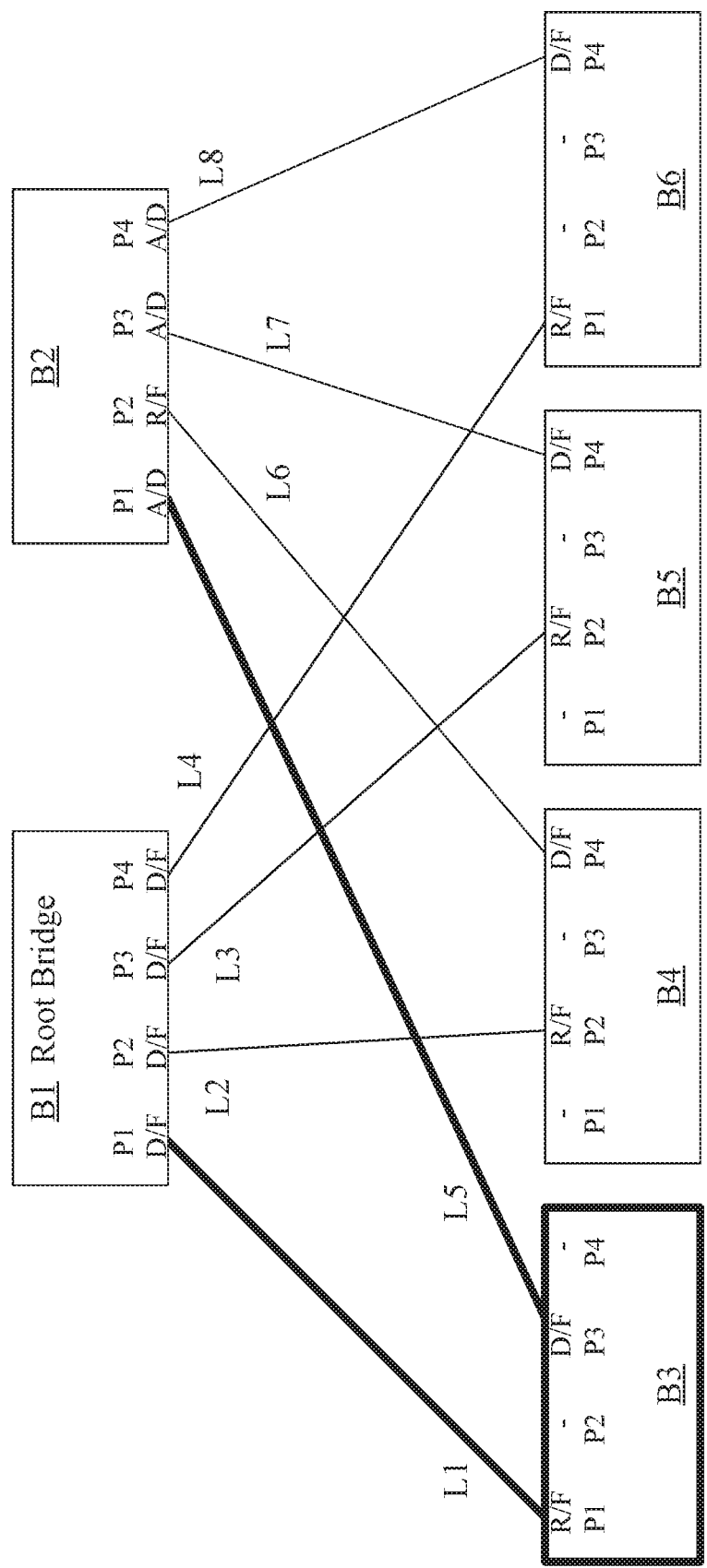

FIGS. 10A, 10B illustrate network reconfiguration when a new, non-root bridge is added. Before the bridge addition, the network is as in FIG. 10A, with bridges B1 (Root), B2, B4, B5, B6, and with links L2 connecting D/F port B1/P2 to R/F port B4/P2; L3 connecting D/F port B1/P3 to R/F port B5/P2; L4 connecting D/F port B1/P4 to R/F port B6/P1; L6 connecting R/F port B2/P2 to D/F port B4/P4; L7 connecting A/D port B2/P3 to D/F port B5/P4; and L8 connecting A/D port B2/P4 to D/F port B6/P4.

Then (FIG. 10B), bridge B3 is added. New link L1 connects port B1/P1 to port B3/P1; and new link L5 connects port B2/P1 to port B3/P3. In this example, the RSTP configuration algorithm leaves bridge B1 as the root bridge. Ports B1/P1 and B3/P1 are initially disabled (FIG. 10A), but become Designated/Discarding. Then bridge B3 receives, on port P1, a superior BPDU from bridge B1 (with the cost to the Root bridge being zero), and makes its port P1 to be the Root port, moving the port to Forwarding (R/F) at step

610 (FIG. 6). Bridge B3 then executed the TO process 612. The test of step 614A fails. If test 614A is the only test at step 614, or there are other tests but test 614 nonetheless fails, then TC processing is performed at step 618.

Bridge B1 sends a Proposal BPDU on port P1, receives Acceptance BPDU, and moves the port P1 to Forwarding state (step 610). Bridge B1 then executes the TC process 612 for port P1. The test 614A fails. If test 614A is the only test at step 614, or there are other tests but test 614 nonetheless fails, then TC processing is performed at step 618.

On link L5, the two ports are initially D/D. Then port B2/P1 becomes Alternate (A/D), and port B3/P3 becomes Designated (D/D). Bridge B3 sends a proposal BPDU on port P3, and receives an Acknowledgement BPDU from bridge B2. Bridge B3 now moves its port P3 to Forwarding (step 610), and executes the TC process 612. The test 614A is successful, so no TC is detected (path 624).

FIGS. 11A through 11E illustrate a Root bridge addition. Before the bridge addition, the network is as in FIG. 11A, with bridges B2 (Root), B3, B4, B5, B6. The ports P1 through P4 of bridge B2 are all Designated/Forwarding. Each link Lx (L1 through L4) connects the respective port B2/Px to the port P4 of the respective bridge B3, B4, B5, B6. The ports P4 of bridges B3, B4, B5, B6 are Root/Forwarding, and the ports P1 through P3 of these bridges are disabled.

Then (FIG. 11B), bridge B1 is added, with links L5 through L8 connecting the ports P1 through P4 of bridge B1 to ports P2 of the respective bridges B3, B4, B5, B6. The newly connected ports—ports B1/P1 through B1/P4 and the ports P2 of bridges B3, B4, B5, and B6—are enabled, and become Designated/Discarding per the RSTP algorithm. The RSTP algorithm then determines, in this example, that bridge B1 should be the Root bridge; see FIG. 11O. Accordingly, in bridges B3 through B6, the ports P2 become Root/Forwarding, and the ports P4 become Designated/Discarding. The ports of bridge B2 also become Designated/Discarding. When a bridge B3, B4, B5, or B6 makes its port P2 Forwarding, the bridge executes the process 612 (FIG. 6). In this process, the test 614A fails. If test 614A is the only test at step 614, or there are other tests but test 614 nonetheless fails, then TC processing is performed at step 618.

Figure 11A:
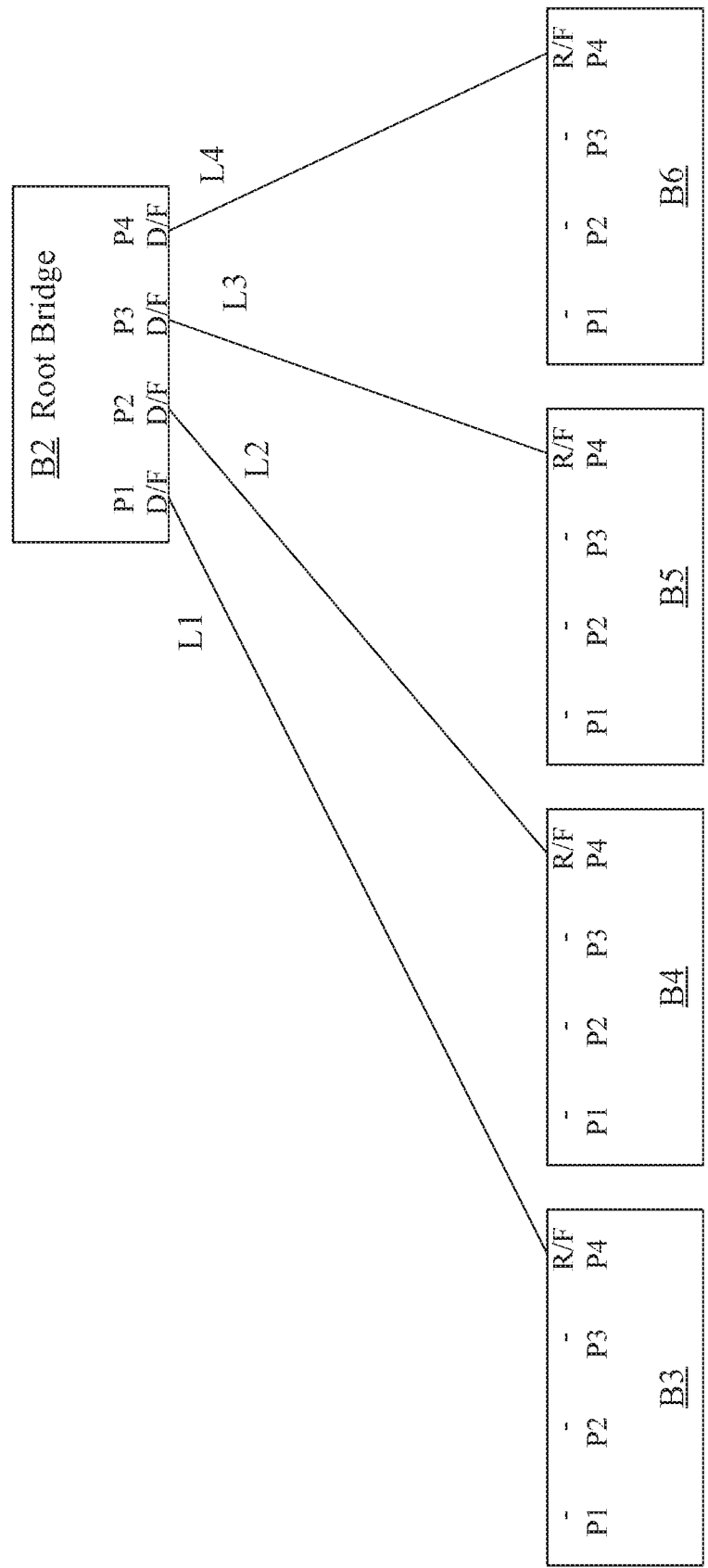
Figure 11B:
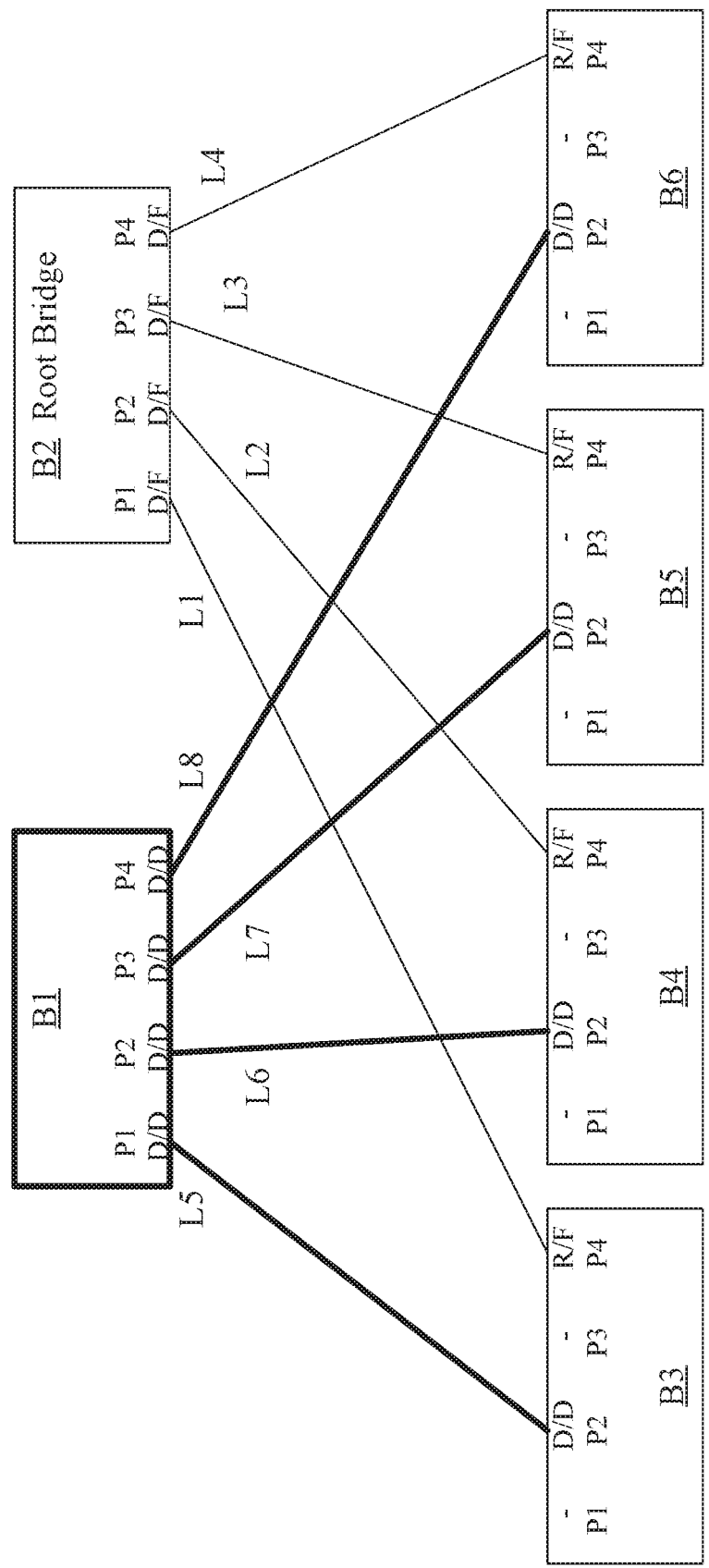
Figure 11C:
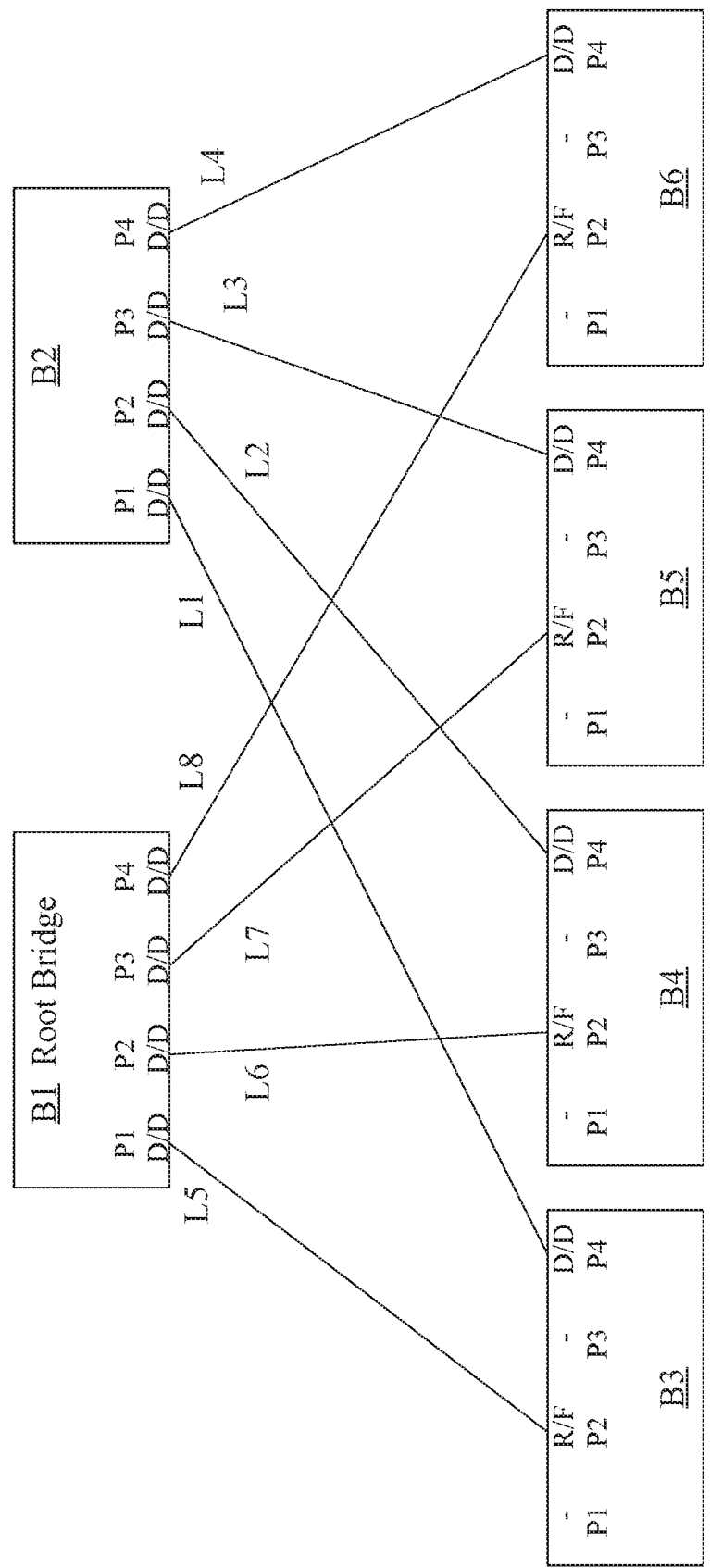
Figure 11D:
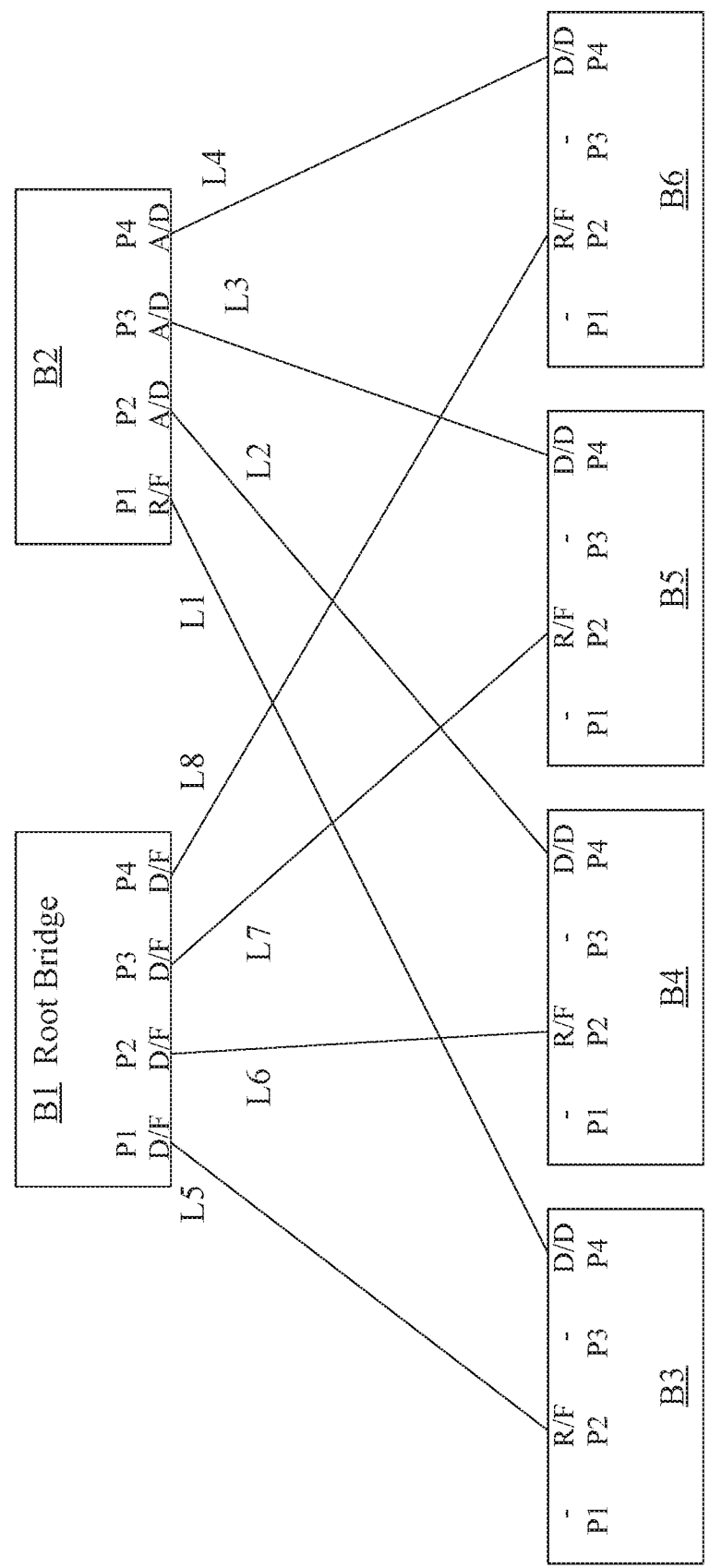
Figure 11E:
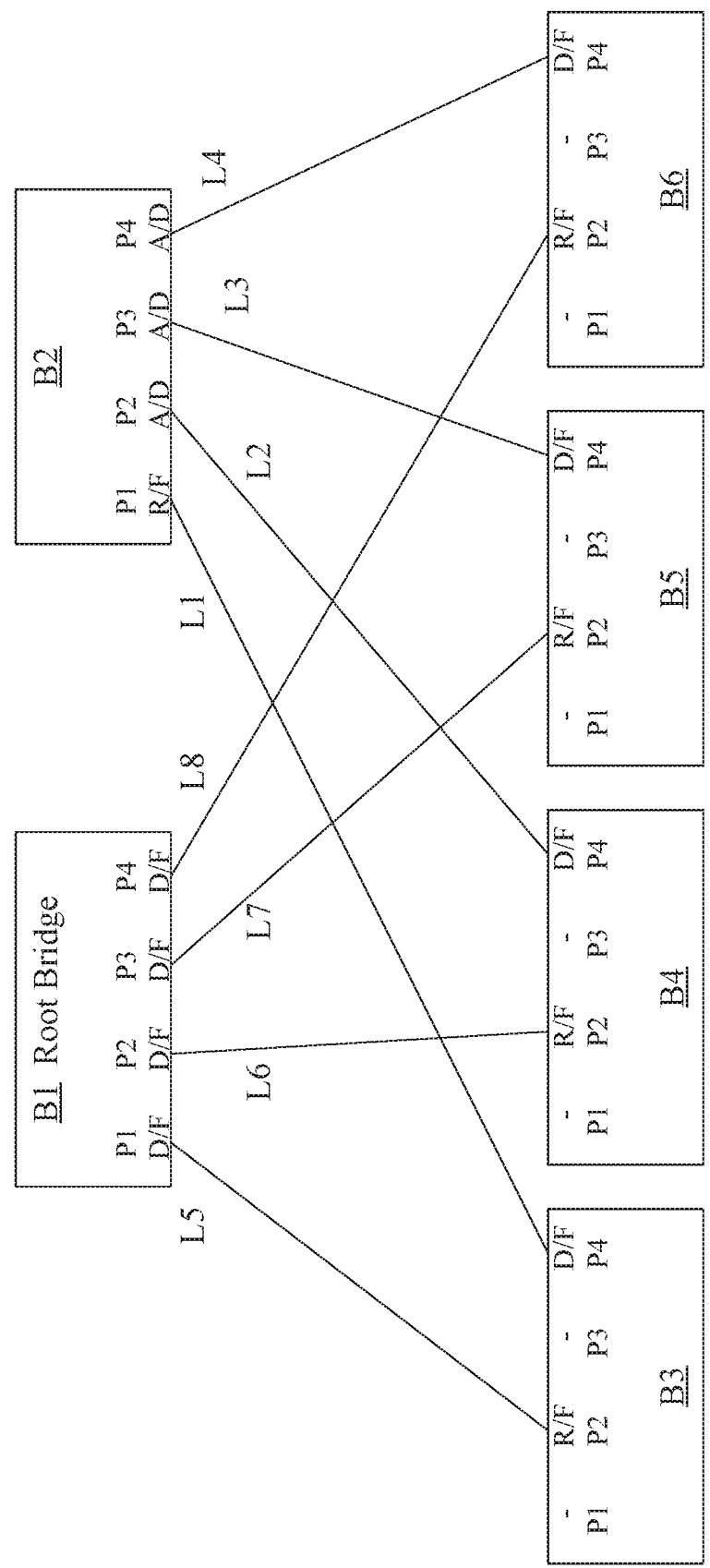

Bridge B1 initiates the sync process on its ports, sending the Proposal BPDU to bridges B3 through B6. Bridges B3 through B6 respond with the Acceptance BPDUs, and send Proposal BPDUs on their ports P4 to bridge B2 to initiate the sync process on links L1 through L4. When Root bridge B1 receives the Acceptances, bridge B1 makes its ports P1 through P4 Forwarding (D/F), as shown in FIG. 11D, and executes the TC process 612 for each port. Test 614A fails. If test 614A is the only test at step 614, or there are other tests but test 614 nonetheless fails, then TC processing is performed at step 618.

Bridge B2 makes its port P1 to be the Root port, as having the best path to the Root bridge B1, and sets the port's state to Forwarding and executes process 612. Test 614A fails. If test 614A is the only test at step 614, or there are other tests but test 614 nonetheless fails, then TO processing is performed at step 618.

Bridge B2 makes the ports P2, P3, P4 Alternate/Discarding. Bridge B2 sends Acceptance BPDUs on its ports P1 through P4 in response to the Proposals received from bridges B3, B4, B5, B6. Upon receiving the Acceptances, the bridges B3, B4, B5, B6 make their ports P4 Forwarding—see FIG. 11E—and perform the TC process 612 for each of these ports. Test 614A is successful at bridges B4, B5, B6, so the TC processing is omitted (path 624). Test 614A fails at bridge B3. If test 614A is the only test at step 614, or there are other tests but test 614 nonetheless fails, then TC processing is performed at step 618.

The invention is not limited to the embodiments discussed above. Some embodiments are defined by the following clauses; the parentheticals provide examples that do not limit the clauses.

Clause 1 defines a method for operating a first bridge in a computer network comprising a plurality of bridges including the first bridge, each bridge including a plurality of ports, the computer network comprising a plurality of network segments (e.g. Lx) each of which is attached to one or more of the ports, the method comprising:

executing, by the first bridge, a spanning tree protocol (e.g. RSTP) to configure ports of the first bridge; and forwarding data by the first bridge based on the ports configuration of the first bridge and based on one or more forwarding databases (e.g. FDB, ARP cache);

wherein executing the spanning tree protocol comprises changing (e.g. at step 610), by the first bridge, a state of at least one port of the first bridge from a first state (e.g. Discarding or Learning) to a second state (e.g. Forwarding), wherein in the second state the bridge uses the port to forward data, but in the first state the bridge does not use the port to forward data;

wherein for each changing operation the method comprises, for the port ("first port") whose state is changed in the changing operation determining (e.g. at 614), by the first bridge, whether a topology change (TC) processing is to be performed which comprises at least one of: (1) removing at least one entry for at least one port of the first bridge from one or more of the forwarding databases; (2) sending a TC notification (TCN) to one or more of the bridges;

wherein determining whether the TC processing is to be performed comprises determining whether a first condition is true (614A), wherein the first condition requires that all of conditions (a), (b), and (c) be true, wherein:

condition (a) is that the first port is attached to a point-to-point link (disabled ports are ignored when determining whether the link is point-to-point);

condition (b) is that the first port is a Designated port for the point-to-point link (i.e. the first port is to be used for all data forwarding between the link and the Root bridge); and condition (c) is that a peer port of the first port is an Alternate or Backup port and is in a state (e.g. Discarding) that cannot be used to forward data;

whenever the first condition is true, omitting the TC processing (e.g. at 624);

for at least one instance when the first condition is not true, performing the TC processing (e.g. at 618).

2. The method of clause 1, wherein the first condition requires the peer port to be an Alternate port.

3. The method of clause 1 or 2, wherein the first condition requires the peer port to be a port of a bridge other than the first bridge.

4. The method of any preceding clause, wherein the first bridge maintains, for each enabled port having a peer port, a state and role of each peer port, the state and role being recorded in a memory of the first bridge.

5. The method of any preceding clause, wherein the TC processing comprises sending a TCN on the first port.

6. The method of any preceding clause, wherein the spanning tree protocol is the Rapid Spanning Tree Protocol.

The invention includes bridges configured to perform the methods discussed above. For example, the bridge may be software-programmed to perform such methods. The invention also includes computer readable media comprising computer instructions which, if executed by the bridge, will cause the bridge to perform the methods discussed above.

Although illustrative embodiments have been shown and described, a wide range of modification, change and substitution is contemplated in the foregoing disclosure and in some instances, some features of the embodiments may be employed without a corresponding use of other features. The features described above can be implemented in one or more Virtual Local Area Networks (VLANs) defined in the computer network, with each VLAN executing xSTP independently of other VLANs, while some other VLANs may be operated without using xSTP. A link Lx may be implemented using a tunnel through a non-LAN network, e.g. the Internet. Other embodiments and variations are within the scope of the invention, as defined by the appended claims.

What is claimed is:

1. A method for operating a first bridge in a computer network comprising a plurality of bridges including the first bridge, each bridge including a plurality of ports, the computer network comprising a plurality of network segments each of which is attached to one or more of the ports, the method comprising:
   executing, by the first bridge, a spanning tree protocol to configure ports of the first bridge; and
   forwarding data by the first bridge based on the ports configuration of the first bridge and based on one or more forwarding databases;
   wherein executing the spanning tree protocol comprises changing, by the first bridge, a state of at least one port of the first bridge from a first state to a second state, wherein in the second state the bridge uses the port to forward data, but in the first state the bridge does not use the port to forward data;
   wherein for each changing operation, the method comprises, for the port ("first port") whose state is changed in the changing operation, determining, by the first bridge, whether a topology change (TC) processing is to be performed which comprises at least one of: (1) removing at least one entry for at least one port of the first bridge from one or more of the forwarding databases; (2) sending a TC notification (TCN) to one or more of the bridges;
   wherein determining whether the TC processing is to be performed comprises determining whether a first condition is true, wherein the first condition requires that all of conditions (a), (b), and (c) be true, wherein:
   condition (a) is that the first port is attached to a point-to-point link;
   condition (b) is that the first port is a Designated port for the point-to-point link; and
   condition (c) is that a peer port of the first port is an Alternate or Backup port and is in a state that cannot be used to forward data;
   whenever the first condition is true, omitting the TC processing;
   for at least one instance when the first condition is not true, performing the TC processing.

2. The method of claim 1, wherein the first condition requires the peer port to be an Alternate port.

3. The method of claim 1, wherein the first condition requires the peer port to be a port of a bridge other than the first bridge.

4. The method of claim 1, wherein the first bridge maintains, for each enabled port having a peer port, a state and role of each peer port, the state and role being recorded in a memory of the first bridge.

5. The method of claim 1, wherein the TC processing comprises sending a TCN on the first port.

6. The method of claim 1, wherein the spanning tree protocol is the Rapid Spanning Tree Protocol.

7. A first bridge for operating in a computer network comprising a plurality of bridges including the first bridge, each bridge including a plurality of ports, the computer network comprising a plurality of network segments each of which is attached to one or more of the ports, the first bridge being configured to execute operations comprising:
   executing a spanning tree protocol to configure ports of the first bridge; and
   forwarding data by the first bridge based on the ports configuration of the first bridge and based on one or more forwarding databases;
   wherein executing the spanning tree protocol comprises changing a state of at least one port of the first bridge from a first state to a second state, wherein in the second state the bridge uses the port to forward data, but in the first state the bridge does not use the port to forward data;
   wherein for each changing operation, the method comprises, for the port ("first port") whose state is changed in the changing operation, determining, by the first bridge, whether a topology change (TC) processing is to be performed which comprises at least one of: (1) removing at least one entry for at least one port of the first bridge from one or more of the forwarding databases; (2) sending a TC notification (TCN) to one or more of the bridges;
   wherein determining whether the TC processing is to be performed comprises determining whether a first condition is true, wherein the first condition requires that all of conditions (a), (b), and (c) be true, wherein:
   condition (a) is that the first port is attached to a point-to-point link;
   condition (b) is that the first port is a Designated port for the point-to-point link; and
   condition (c) is that a peer port of the first port is an Alternate or Backup port and is in a state that cannot be used to forward data;
   whenever the first condition is true, omitting the TC processing;
   for at least one instance when the first condition is not true, performing the TC processing.

8. The first bridge of claim 7, wherein the first condition requires the peer port to be an Alternate port.

9. The first bridge of claim 7, wherein the first condition requires the peer port to be a port of a bridge other than the first bridge.

10. The first bridge of claim 7, wherein the first bridge maintains, for each enabled port having a peer port, a state and role of each peer port, the state and role being recorded in a memory of the first bridge.

11. The first bridge of claim 7, wherein the TC processing comprises sending a TCN on the first port.

12. The first bridge of claim 7, wherein the spanning tree protocol is the Rapid Spanning Tree Protocol.

13. A computer readable medium comprising one or more computer instructions for execution by a first bridge in a computer network comprising a plurality of bridges including the first bridge, each bridge including a plurality of ports, the computer network comprising a plurality of network segments each of which is attached to one or more of the ports, the one or more computer instructions programming the first bridge to execute operations comprising:

executing, by the first bridge, a spanning tree protocol to configure ports of the first bridge; and forwarding data by the first bridge based on the ports configuration of the first bridge and based on one or more forwarding databases;

wherein executing the spanning tree protocol comprises changing, by the first bridge, a state of at least one port of the first bridge from a first state to a second state, wherein in the second state the bridge uses the port to forward data, but in the first state the bridge does not use the port to forward data;

wherein for each changing operation, the method comprises, for the port ("first port") whose state is changed in the changing operation, determining, by the first bridge, whether a topology change (TC) processing is to be performed which comprises at least one of: (1) removing at least one entry for at least one port of the first bridge from one or more of the forwarding databases; (2) sending a TC notification (TCN) to one or more of the bridges;

wherein determining whether the TC processing is to be performed comprises determining whether a first condition is true, wherein the first condition requires that all of conditions (a), (b), and (c) be true, wherein:

condition (a) is that the first port is attached to a point-to-point link;

condition (b) is that the first port is a Designated port for the point-to-point link; and condition (c) is that a peer port of the first port is an Alternate or Backup port and is in a state that cannot be used to forward data;

whenever the first condition is true, omitting the TC processing;

for at least one instance when the first condition is not true, performing the TC processing.

14. The computer readable medium of claim 13, wherein the first condition requires the peer port to be an Alternate port.

15. The computer readable medium of claim 13, wherein the first condition requires the peer port to be a port of a bridge other than the first bridge.

16. The computer readable medium of claim 13, wherein the first bridge maintains, for each enabled port having a peer port, a state and role of each peer port, the state and role being recorded in a memory of the first bridge.

17. The computer readable medium of claim 13, wherein the TC processing comprises sending a TCN on the first port.

18. The computer readable medium of claim 13, wherein the spanning tree protocol is the Rapid Spanning Tree Protocol.

* * * * *